Nov. 10, 1964 C. P. DE BIASI 3,156,473
MATERIAL SPREADING SPINNER
Filed Jan. 25, 1961 3 Sheets-Sheet 1

Charles P. deBiasi
INVENTOR.

Nov. 10, 1964 C. P. DE BIASI 3,156,473
MATERIAL SPREADING SPINNER
Filed Jan. 25, 1961 3 Sheets-Sheet 2

Charles P. deBiasi
INVENTOR.

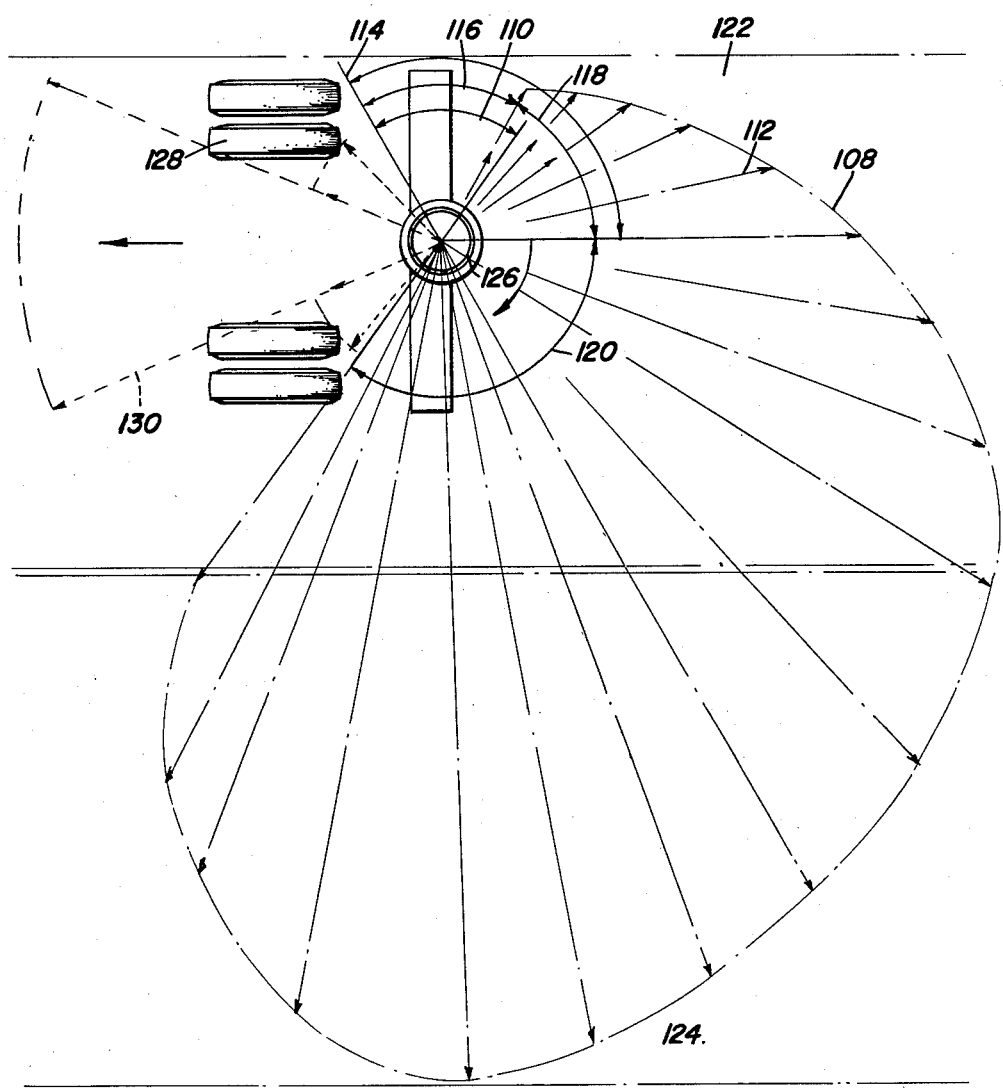

United States Patent Office 3,156,473
Patented Nov. 10, 1964

3,156,473
MATERIAL SPREADING SPINNER
Charles P. de Biasi, 74 Braman Road, Waterford, Conn.
Filed Jan. 25, 1961, Ser. No. 84,862
14 Claims. (Cl. 275—15)

The present invention generally relates to a material spreader and a method of spreading material, and more specifically to spinner structure for use in spreading material that is primarily adapted for use in combination with a vehicle load carrying body and the spinner structure of the present invention is an improvement on co-pending application Serial No. 672,331, filed July 16, 1957, for Material Spreader for Use on a Dump Truck, now U.S. Pat. No. 2,969,987, issued January 31, 1961.

An object of the present invention is to provide spinner structure incorporating a novel arrangement of apparatus which will throw material generally laterally or substantially horizontally outward rather than upwardly such as occurs with conventional spinners.

Another object of the present invention is to provide spinner structure having a spinner assembly including a rotatable spinner plate-like member with fins thereon in which the fins are curved, straight and in radial lines or at an angle to a radial line so that the material to be spread will stay contained on the plate-like member disposed against the curved surface of the fins until the centrifugal force created by rotating the spinner plate-like member is sufficient to overcome the force of containment and cause the material to move around the curved fins thereby assuring a greater velocity of the material as it leaves the spinner plate-like member.

Another very important object of the present invention is to provide material spreading spinner structure incorporating a novel arrangement of apparatus for providing a method of directional spreading of material such as will enable a truck that is spreading such material to drive in the right hand slow lane where it belongs and still spread such material over the entire highway in substantially an even pattern and at the same time permits the truck to distribute material, such as sand in front of the rear wheels thereof in order to facilitate traction for the truck during ice storms or the like.

The primary feature of the present invention is the provision of spreader structure and a method of spreading material which relies on a theory of containment of the material which is to be spread. Conventional spreaders allow the material which is to be spread to free fall from the truck body or from the end of the feeding belt or screw auger onto the spinner. However, it is an essential feature of the present invention to contain the material and always maintain material in contact with and preferably directly on the spinner plate-like member of the spinner assembly. Obviously, once the material is free falling as in conventional spreaders, control of the material is completely lost. In distinction, in this invention, the material is contained by housings, casings, sleeves or tubes and the spinner structure on the top surface of the spinner plate-like member of the spinner assembly so that the material will not flow unless the spinner plate-like member turns and when the spinner plate-like member does turn, the material flows due to centrifugal force created thereby.

Still another very important object of the present invention is to provide material spinner structure which is relatively simple in construction, efficient in operation, operating on the theory of containment rather than free falling discharge and relatively inexpensive to manufacture and operate.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 5 is a plan schematic view illustrating the pattern of discharge of material from the spreader.

Figure 1:
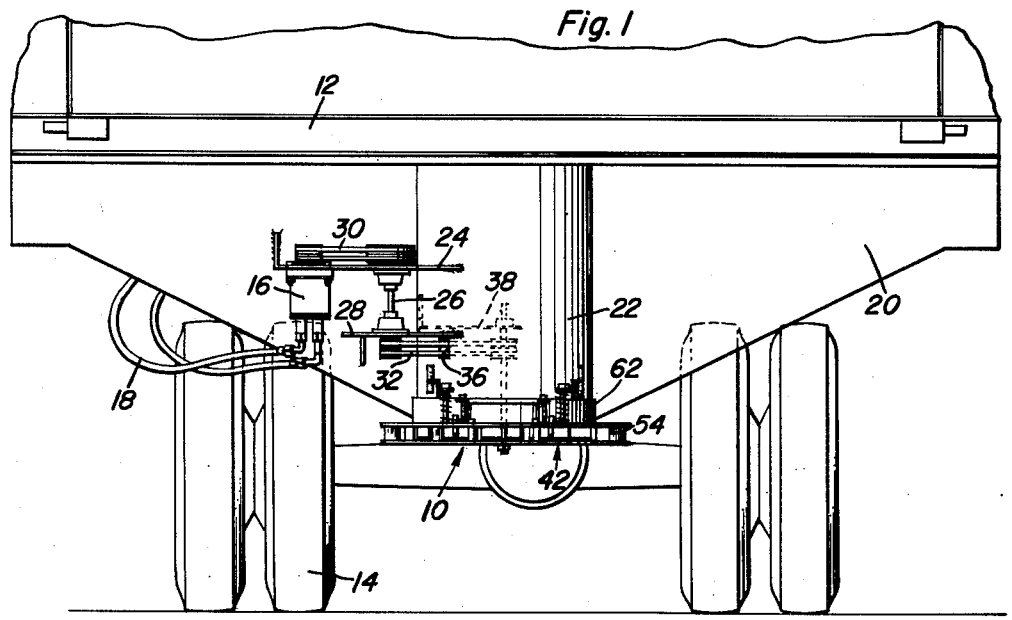
FIGURE 1 is a rear elevational view of a spreader having the spreading spinner structure of the present invention mounted on the rear of a vehicle body.

Attention is now directed to FIGURE 1 of the drawing wherein there is shown spinner structure 10 of a material spreader which, as illustrated and if desired, may be mounted on the rear of a load carrying vehicle body 12 such as a dump body or other similar body mounted in a conventional manner on a truck or the like. The truck is provided with the usual rear driving wheels 14 and a hydraulic pump or the like for supplying power to a hydraulic motor 16 through suitable conduits 18.

The spinner structure 10 is supported from a hopper 20 which receives material from the vehicle body 12 and feeds it generally downwardly and centrally towards a generally centrally disposed elongate open-ended housing portion 22. The housing portion 22 is provided with a laterally extending bracket 24 which supports the hydraulic motor 16 and an idler shaft 26 which has the lower end thereof supported by a bracket 28. Drive belts 30 interconnect the output shaft of the hydraulic motor 16 and the shaft 26 and other belts 32 interconnect the shaft 26 and a generally vertically disposed i.e., more vertical than horizontal, shaft 34 extends substantially centrally within the confines of the housing 22. The belts 32 extend through an opening 36 in the housing 22 for driving the shaft 34. The shaft 34 is supported by suitable bearing brackets 38 or the like and there is provided means adjacent the lower end portion of the shaft 34 which may take the form of a removable nut 40 screw threaded thereon for use in clamping a spinner disk-like assembly 42 between washers 44 and 46 with the washer 46 being rigid with the shaft 34 with the spinner disk-like assembly 42 being disposed generally subjacent to the lower end portion of the housing 22.

The spinner disk-like assembly 42 includes a pair of substantially planar plate-like members 48 and 50 which are disposed in spaced relationship relative to an open substantially unobstructed end portion of an elongated casing, sleeve or tube 62 to define therewith a space therebetween. The casing, sleeve or tube 62 may be telescopically adjustably supported by the lower end portion of the housing 22, for a reason as will be hereinafter more fully described and disclosed, with the casing, sleeve or tube 62 projecting therefrom and terminating in close proximity to the plate-like members 48 and 50 of the spinner disk-like assembly 42. The plate-like members 48 and 50 may be secured together by small fastener bolts 52 thereby enabling replacement of either or both of the members in the event of wear. The lower plate-like member 48 extends peripherally beyond the upper plate-like member 50 as well as the casing, sleeve or tube 62 and is provided with a plurality of circumferentially spaced longitudinally projecting or upstanding fins 54. Each fin 54 is provided with a laterally extending lower edge portion 56 which is bolted to the plate-like member 48 by at least one bolt 58. Thus, the fins 54 are removably attached to the plate-like member 48 for easy removal thereof and replacement when necessary.

Attached to the top edge portions of the fins 54 is an annular endless ring-like member 60 which may be rigidly secured to the fins 54 by means such as welding or the like. The ring-like member 60 overlies the fins 54 and the outer periphery thereof projects generally laterally outwardly beyond the fins 54 while the inner periphery extends generally laterally inwardly beyond the fins 54 and terminates for positioning in adjacent relationship to the outer surface of the generally longitudinally or vertically adjustable casing, tube or sleeve 62. The ring-like member 60 serves to prevent material from flying out of the spinner structure 10 above a generally laterally extending substantially horizontally disposed plane which is common to the ring-like member 60. Therefore, the spinner structure 10 cannot throw material into the windshield of a car which may be following a truck with the material spreader in operation. Also, the ring-like member 60 insures that all material is spread in one thin plane. Due to the wear of the components of the assembly 42, the various components may be easily replaced as wear occurs.

Figure 4:
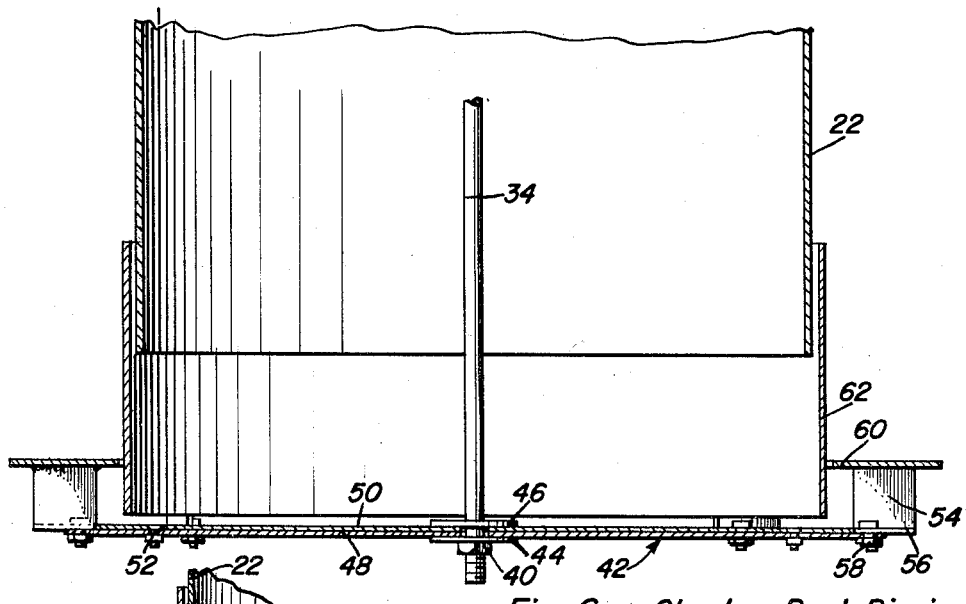
FIGURE 4 is a transverse vertical sectional view taken substantially through the center of the structure of the present invention.
Figure 6:
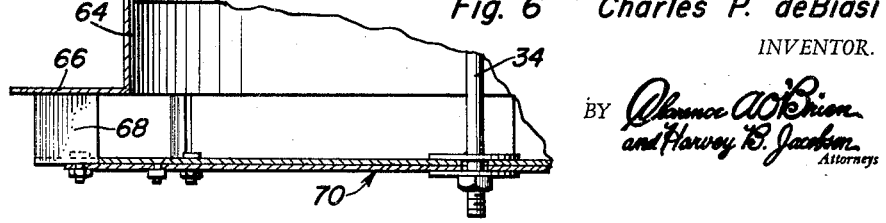
FIGURE 6 is a detailed sectional view illustrating a modified form of the invention.

The disclosure illustrated in FIGURE 6 is substantially the same as that in FIGURE 4 but this construction is used with a conventional free fall spreader which does not have an adjustable casing tube or sleeve 62 associated therewith. In this form of the invention, a casing tube or sleeve 64 is secured rigid with an annular endless ring-like member 66 which has fins 68 rigid therewith and also rigid with a spinner disk-like disk assembly 70 which is somewhat similar to the assembly 42 which is employed in FIGURE 4 and the ring-like member 66 serves the same purpose as the member 60 in FIGURE 4.

Figure 3:
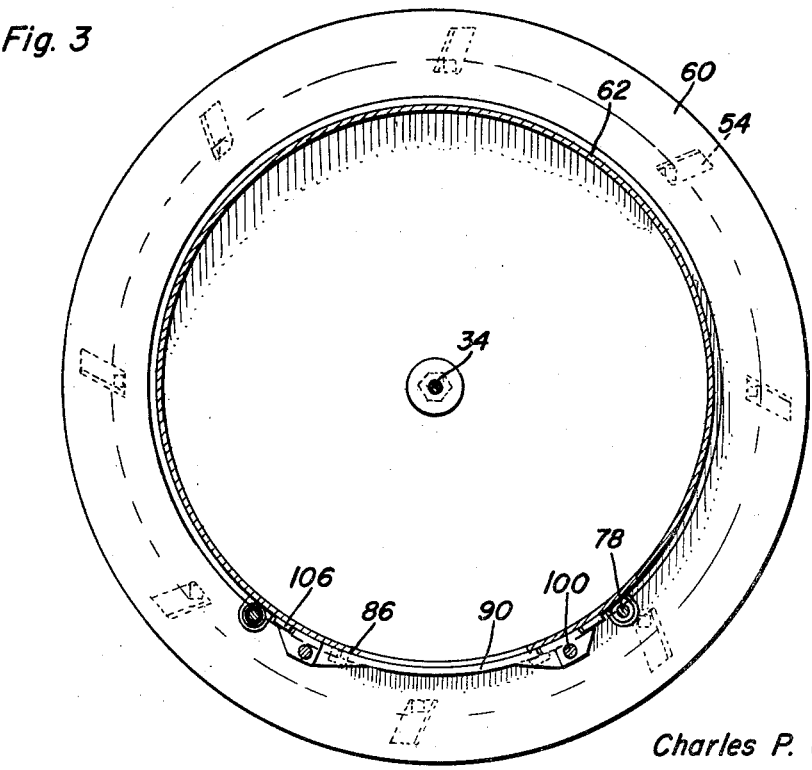
FIGURE 3 is a transverse, plan sectional view taken substantially upon a plane passing along section line 3—3 of FIGURE 2 illustrating further structural details of the invention.

It is pointed out that the angular position of the fins 54 or 68 in relation to a radial plane may vary as desired and in order to achieve any desired pattern of spread. However, the fins 54 or 68 are curved or disposed in an angular relation to a radial line common to the axis of rotation of the shaft 34 with the fins 54 or 68 each being disposed with the lateral or radial outer edge portions thereof being advanced in the direction of rotation of the spinner disk-like assembly 42 or 70 which is clockwise as illustrated in FIGURE 3 of the drawing, in order to facilitate in containing the material which is to be spread within the confines of the housing 22, casing, sleeve or tube 62 or 64 with the material being in contact with and directly engaging the upper surface of the plate-like members 48 and 50 when the spinner assembly 42 or 70 is at rest and stationary.

Figure 2:
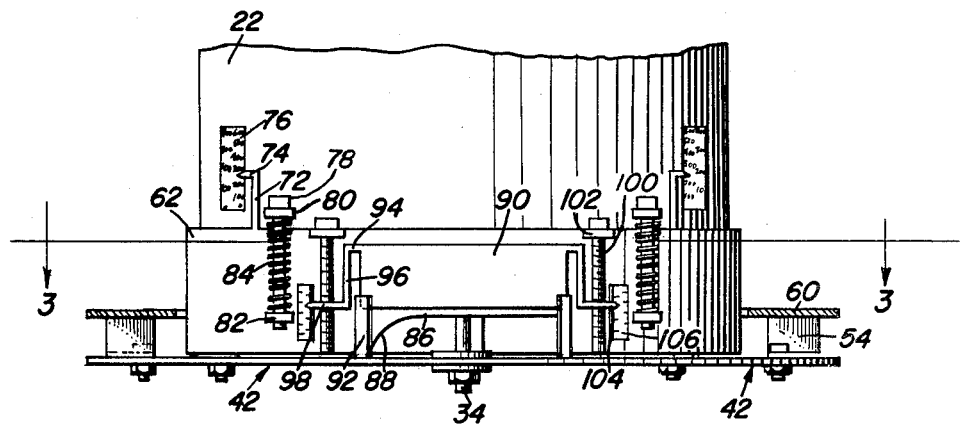
FIGURE 2 is a detailed rear elevational view of the spinner structure illustrating the control mechanism and gauging mechanism therefor.

Referring now specifically to FIGURE 2, the movable tube, casing or sleeve 62 is provided with a pair of upstanding pointer members or indicators 72 each having a generally horizontally extending pointed end 74 for registering with a scale in the form of graduated indicia 76 whereby the graduated indicia 76 will indicate the rate of discharge of material from the material spreader assembly. Of course, the indicia 76 will be calibrated as to the particular material and other factors affecting the rate of discharge of the material from the material spreader assembly.

Apparatus is provided as shown in FIGURE 2 for controlling the discharge of the material from the material spreader by independently varying the space between the open end portion of the casing, tube or sleeve 62 and the plate-like members 48–50 of the spinner disk-like assembly 42 as well as the size of a laterally opening recess, aperture, notch, slot or opening 86, which is provided in the open end portion of the casing, tube or sleeve 62. The apparatus as shown in FIGURE 2 provides a first material discharge control means for selectively varying the space between the open end portion of the casing, sleeve or tube 62 and the plate-like members 48–50 and a second discharge control means for selectively varying the size of the recess, opening, aperture or notch 86 in the open end portion of the casing, tube or sleeve 62. In order to variably adjust the space between the plate-like members 48–50 of the spinner assembly 42 and the open end portion of the sleeve, casing or tube 62, there is provided a plurality of threaded bolts 78 each of which respectively extend through a lug 80 that is rigid with the central housing 22. The lower ends of the bolts 78 are each threaded through a lug 82 rigid with the casing, tube or sleeve 62. A coil spring 84 is disposed between the lugs 82 and the lugs 80 thus retaining the casing, sleeve or tube 62 in its lower-most position whereby rotational movement of the bolts 78 will effect raising or lowering of the sleeve, casing or tube 62 thus varying the space between the lower end portion of the casing, sleeve or tube 62 and the upper surface of the spinner disk-like assembly 42 for varying the rate of output of material. Thus, the bolts 78, the lugs 80 and 82 and the springs 84 define resilient or yieldable connecting means between the housing portion 22 and the sleeve, casing or tube 62. The springs 84 also defines bias structure which serve to release stones, for example, if the space between the casing, sleeve or tube 62 and the top of spinner, plate-like member 50 is ¼ inch, a stone of ⅜ inch dimension might become lodged in this space since it is too large to pass out. Without the bias structure defined by the springs 84 this stone would jam or tend to stall the spreader. With the springs 84, the sleeve, casings or tube 62 can rise and permit the stone to be expelled. Actual experience with the spreader indicates the small stone such as ⅜ inch stones in ¼ inch opening will be expelled while 1 inch stones are thrown back into the spreader in some instances, and larger stones do not engage in the opening.

The sleeve, casing or tube 62 or 64 is provided with the aperture slot, notch, recess or opening 86 adjacent the bottom surface thereof which has one end portion 88 curved. Second material discharge control means is provided for varying the size of the recess, notch, slot, aperture or opening 86 which includes sliding gate-like structure 90 for the recess, aperture, notch, slot or opening 86 and the slide gate 90 is guided in its vertical movement by a pair of slides 92 which slidably retain the edge of the gate-like structure 90 in sealed relation to the aperture slot, notch, recess or opening 86. Each end edge of the slide gate-like structure 90 is provided with a projection 94 which includes a downwardly extending portion 96 terminating in a generally horizontally disposed portion 98 which defines an outwardly extending pointed member that threadedly receives an adjustment bolt 100. The adjustment bolts 100 are threaded through the respective horizontal portion 98 of the extension 96 and engage with a lug 102 on the sleeve, casing or tube member 62 or 64 whereby the gate-like structure 90 may be adjustably raised and lowered independently of the adjustment which may have been made to the space between the casing, sleeve or tube 62 and the spinner plate-like members 48–50. The horizontal portions 98 form pointers 104 for registry with a graduated scale 106 thus indicating the aperture-adjusted position of the gate-like structure 90.

The notch, recess, slot, aperture or opening 86 and the gate-like structure 90 serve as a directional material discharge control means and the pointer 74 and indicia 76 will be used only when circular spreading or non-directional spreading is desired. In this arrangement, the driver of the truck simply sets the indicator to the pounds per mile desired by turning the bolts 78 and precisely this amount of material will be spread. The diameter of the spread pattern is a function of the r.p.m. of the spinner structure 10 and is governed by an orifice control valve for the hydraulic motor 16. Other methods may be employed for setting the space between the top of the spinner plate-like members 48–50 and the lower edge of the casing, sleeve or tube 62 or 64. For example, feeler gauges or other type of gauging devices may be employed for varying the position of the casing, sleeve or tube in relation to the spinner plate-like members.

The curved edge 88 of the recess, slot, notch, aperture or opening 86 is part of the adjustable casing, sleeve or tube 62 or 64 and has for its purpose the aiding in dislodging of small stones which may become jammed between the slot or opening and the spinner structure 10. While only a single notch, recess, slot, aperture or opening 86 having the gate-like structure 90 has been illustrated, there actually would be a series of three of these two of which are illustrated as 110 and 126 in FIGURE 5 of the drawing, one to spread to the left of the truck, one to spread in front of the truck wheels and one to spread to the right of the truck such as onto the shoulders of the road, which, is a highly desirable procedure especially during shoulder maintenance. When it is desired to spread circular patterns, the gate-like structures 90 would all be down or closed with the bottom edge thereof flush with the bottom edge of the adjustable casing, sleeve or tube 62.

Reference is now made to FIGURE 5 which schematically illustrates a spread pattern when using the method of material discharge directional control. The arrows in the group having the ends enclosed by line 108 represent, in scale, the actual pattern of spread when the material is fed from the recess, notch, aperture, slot or opening 110 which is 67°. The length of the arrows designated by 112 are actually proportional to the rate of discharge. As will be readily apparent, there is a lead in that the material is not discharged straight out in a radial line to the opening 110. Beginning from the reference line 114, there will be a very light spread which may be considered a light 60° lead spread designated by numeral 116. This will be followed by a light 60° spread 118 and then a heavy 125° spread designated by numeral 120. As illustrated, the pattern covers both lanes of a highway designated by numeral 122 and 124 respectively and on a dual lane highway, this enables both lanes to be effectively sanded while the truck vehicle stays in the right hand lane 122. The second opening 126 is provided which, due to the lead required, will discharge sand forwardly in a pattern under and in front of the rear driving wheels 128. The pattern of sand is designated by numeral 130 and has the periphery thereof arranged in such a manner that sand will be discharged in front of both rear driving wheels thereby maintaining traction of the wheels even if the surface being traversed is completely smooth ice.

By orientating the openings such as 86, 110, 126 in the desired angular positions and for the desired angular extent and by controlling the positions of the closure gate-like structures 90 for each of the openings, the pattern of discharge may be readily adjusted and determined so that an equal covering of sand or other material being discharged will be provided completely across two or more lanes of a highway. Further, by orientating the openings such as 86, 110, 126 in the desired angular positions and for the desired angular extent, a pattern of spread to any sector of a circle can be developed and to any radius of a circle. The volume of material spread is determined by the first material discharge control means which varies the space by adjustably positioning the casing, sleeve or tube 62 in relation to the top surface of the spinner plate-like members 48–50 and the diameter of the spread is varied by the r.p.m. of the spinner disk-like assembly 42 or 70 since the casing, sleeve or tube 62 or 64 is actually a gate or valve. The annular ring-like member 60 will prevent upward movement of the sand as it leaves the spinner structure 10 and the particular angulation of the fins 54 will retain or contain the material until it is discharged in a controlled direction and a controlled pattern and substantially in a horizontal plane.

In conventional spreaders, the rate of spreading is controlled by the speed of the belt or screw, in the present invention by the size of the space set by the adjustable tube, casing or sleeve 62; or to put it another way, the adjustable tube, casing or sleeve 62 is actually a material discharge control means. In conventional spreaders, if the belt or screw is feeding, material is spread or dumped regardless of whether or not the spinner is turning. Furthermore, the belt or screw must be synchronized with the spinner or they sometimes throw the material where it is not desired; for instance onto the shoulders or side slopes of the road instead of onto the pavement. With this invention, material is spread only when the spinner structure 10 is turning. Furthermore, the material being contained, feeding the spinner structure 10 is not required because it always has material positioned on its area inside the adjustable tube, casing or sleeve 62 and material is fed to the broadcasting fins 54 not by gravity but by centrifugal force and since gravity keeps it close to the top of the spinner surface of the plate-like members 48–50, the material is spread in one thin plane.

Another inherent feature is that since the top of the spinner plate-like members 48–50 inside the adjustable tube, casing or sleeve 62 is a smooth clean surface, stones and lumps can enter the spreader structure 10 without any effect to the spreader, they simply rotate with the material and when the spreader is empty they simply rattle. At the end of a trip and before the driver gets a new load of material he simply reaches down, picks out the stones or lumps and throws them away.

Conventional spreaders, with free falling stones, will throw the stones and are usually provided with hoods to prevent throwing stones into the windshield of a car which might be following the truck. The vertical angle that a stone may take depends entirely on which part of the spinner fins contacts the stone. In this spreader, larger stones will stay inside the spreader structure 10, stones smaller or slightly larger than the setting of the adjustable tube opening will be thrown by the spinner but in a plane parallel to the road surface, and this plane is only about one foot above the road surface. Conventional spinners usually have only four fins for broadcasting, this is due to their small diameter, the above spinners are several times greater in diameter. These two facts make it possible for the present spinner structure 10 to have as many as thirty broadcasting fins 54. The more fins 54 on the spreader structure 10 the better the spreading pattern.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A material spreader comprising
    a generally vertically disposed open-ended casing adapted to be mounted on a load carrying body of a vehicle for receiving material to be spread therefrom,
    a plate rotatably mounted below the casing in spaced relationship relative thereto for spreading material through said space in a direction which is generally laterally of the casing,
    said casing having openings adjacent the lower edge portion thereof,
    closure gate structure for each of said casing openings,
    means adjusting the gate structure in relation to the respective opening for varying the size of the opening, and
    resilient means for urging the casing to an adjusted position to permit material to be expelled from the casing up to a dimension slightly larger than the adjusted dimension of the respective opening whereby larger material will be retained in the casing for subsequent removal.

2. The structure as defined in claim 1 wherein the plate is of planar configuration with the surface thereof being substantially smooth.

3. A material spreader comprising
an open ended housing,
an open ended casing disposed adjacent an open end of the housing,
spinner structure rotatably mounted adjacent an open end of the casing in spaced relationship relative thereto and defining therewith a space therebetween through which material may be spread in a generally lateral direction relative thereto,
yieldable means mounting said casing to the housing to enable the size of the space between the casing and the spinner structure to be varied,
adjustable means for said yieldable means,
said casing having an aperture disposed adjacent the open end thereof, and
control means for varying the size of the aperture.

4. The material spreader as set forth in claim 3 together with
an indicator mounted on the control means for indicating the size of the aperture and thus show the amount of material that may pass therethrough.

5. The material spreader as set forth in claim 3 together with
guage means for indicating the amount of material that will pass through the space defined by the casing and the spinner structure.

6. The material spreader as set forth in claim 3 wherein said yieldable means comprises
lug means secured to said housing and said casing, and
said adjustable means is connected to said lug means for moving the casing toward and away from said spinner structure to vary the size of said space.

7. The material spreader as set forth in claim 6 wherein
said adjustable means comprises
threaded bolt members, and
resilient means mounted on each of said bolt members between said lug means to exert yielding pressure against said lug means.

8. The material spreader as set forth in claim 3 wherein said spinner structure is provided with a plurality of spaced apart generally upstanding fin-like members, and
an annular ring-like member secured in overlying relationship relative to the fin-like members.

9. The material spreader as defined in claim 8 wherein said fin-like members are disposed in angular relationship relative to a radius of the spinner structure for containing material within the confines of the casing until centrifugal force overcomes the force of containment created thereby.

10. Spinner structure for a material spreader, said spinner structure comprising
an open ended casing for receiving material which may be spread therefrom,
a plate-like member for spreading material generally laterally relative to the casing,
means rotatably mounting said plate-like member adjacent one open end of the casing in spaced relationship thereto and defining therewith a space therebetween through which material may be spread,
said casing having a plurality of apertures in the edge of the one open end thereof, and
apparatus for controlling material discharge from the casing through the space and the apertures,
said apparatus comprising a yieldable connection between the spreader and the casing for varying the size of the space between the casing and the plate-like member, and
closure structure for each of the apertures in the casing for varying the respective sizes thereof.

11. The spinner structure as set forth in claim 10 wherein
said apertures are oriented as to spatial relation and extent for forming a pattern of spread to various sectors and radii of a circle.

12. A material spreader comprising
a generally vertically disposed elongated substantially cylindrical open ended housing adapted to be mounted on a load carrying body of a vehicle for receiving material to be spread therefrom,
a substantially cylindrical open ended casing telescopically disposed adjacent the lower open end of the housing for generally axial movement relative thereto,
substantially horizontally disposed generally planar spinner plate-like structure rotatably mounted subjacent the lower open end of the housing in spaced relationship relative to the casing and defining therewith a space therebetween through which material may be spread in a generally lateral direction relative thereto,
resilient means mounting said casing to the housing to enable said casing to move in a generally axial direction to vary the size of the space between the casing and the plate-like structure,
said casing having at least one circumferentially extending elongate aperture disposed adjacent the lower open end thereof, and
variable material discharge control means for varying the size of the aperture.

13. In combination with a material spreader having an elongate casing for containing a material to be spread therefrom,
spinner structure for receiving material from said casing and for spreading such material generally laterally relative thereto,
said spinner structure comprising
a substantially planar plate-like member rotatably mounted adjacent one end portion of the casing in spaced relationship relative thereto and defining therewith a space therebetween through which material may be spread,
said casing having a plurality of generally laterally opening apertures in the one end portion thereof, and
apparatus for controlling material discharge from the casing through the one end portion thereof, the space between the one end portion of the casing and the plate-like member, as well as through the apertures in the one end portion of the casing by selectively varying the size of the space between the one end portion of the casing and the plate-like member and the size of the apertures in the one end portion of the casing,
said apparatus comprising
first material discharge control means having a yieldable adjustment for varying the position of the one end portion of the casing relative to the plate-like member, and
second material discharge control means having selectively operable closure structure adjustably mounted adjacent each of the apertures in the one end portion of the casing.

14. In combination with a material spreader having a housing for containing a material to be spread therefrom,
a spinner assembly for receiving material from said housing and for spreading such material generally laterally relative thereto,
said spinner assembly comprising a casing projecting from said housing and terminating in a substantially open end portion, a substantially planar plate-like member rotatably mounted subjacent the open end portion of the casing and defining therewith a material discharge space therebetween with the peripheral edge portion of the plate-like member terminating laterally beyond the casing, a plurality of fins secured to the peripheral edge portion of the plate-like member, an endless annular ring-like member secured to the fins and projecting generally laterally therefrom and terminating in close proximity to the open end portion of the casing, said casing having a plurality of generally laterally opening apertures in the open end portion thereof, and apparatus for controlling material discharge from the housing through the open end portion of the casing, the space between the open end portion of the casing and the plate-like member, as well as through the apertures in the open end portion of the casing by selectively varying the size of the space betwen the open end portion of the casing and the plate-like member and the size of the apertures in the open end portion of the casing, said apparatus comprising first material discharge control means disposed between the housing and the casing to define a yieldable connection therebetween, and second material discharge control means having closure structure adjustably mounted adjacent each of the apertures in the open end portion of the casing.

References Cited in the file of this patent

UNITED STATES PATENTS

| | | |
|---|---|---|
| 407,657 | Henrichson | July 23, 1889 |
| 1,166,476 | Parrish | Jan. 4, 1916 |
| 1,166,477 | Parrish | Jan. 4, 1916 |
| 1,938,669 | Smith | Dec. 12, 1933 |
| 2,418,271 | Meincke | Apr. 1, 1947 |
| 2,550,303 | Simpson | Apr. 24, 1951 |
| 2,726,089 | Baker | Dec. 6, 1955 |
| 2,961,245 | Romeiser | Nov. 22, 1960 |
| 2,967,604 | Topp | Jan. 10, 1961 |
| 2,969,987 | De Biasi | Jan. 31, 1961 |

FOREIGN PATENTS

| | | |
|---|---|---|
| 161,780 | Sweden | Dec. 31, 1957 |